(12) United States Patent
Brecht

(10) Patent No.: US 12,010,247 B2
(45) Date of Patent: Jun. 11, 2024

(54) IMPLEMENTATION OF A BUTTERFLY KEY EXPANSION SCHEME

(71) Applicant: VOLKSWAGEN AKTIENGESELLSCHAFT, Wolfsburg (DE)

(72) Inventor: Benedikt Brecht, Berlin (DE)

(73) Assignee: VOLKSWAGEN AKTIENGESELLSCHAFT (DE)

(*) Notice: Subject to any disclaimer, the term of this patent is extended or adjusted under 35 U.S.C. 154(b) by 351 days.

(21) Appl. No.: 17/607,874

(22) PCT Filed: May 14, 2020

(86) PCT No.: PCT/EP2020/063429
§ 371 (c)(1),
(2) Date: Oct. 30, 2021

(87) PCT Pub. No.: WO2020/229586
PCT Pub. Date: Nov. 19, 2020

(65) Prior Publication Data
US 2022/0191045 A1 Jun. 16, 2022

Related U.S. Application Data

(60) Provisional application No. 62/847,829, filed on May 14, 2019.

(51) Int. Cl.
*H04L 9/32* (2006.01)
*H04L 9/08* (2006.01)

(52) U.S. Cl.
CPC .......... *H04L 9/3263* (2013.01); *H04L 9/0869* (2013.01); *H04L 2209/42* (2013.01); *H04L 2209/84* (2013.01)

(58) Field of Classification Search
CPC . H04L 9/3263; H04L 9/0869; H04L 2209/42; H04L 2209/84
(Continued)

(56) References Cited

U.S. PATENT DOCUMENTS

2014/0108786 A1* 4/2014 Kreft .................. G06Q 20/3825
713/194
2016/0294564 A1* 10/2016 Mock ...................... H04L 9/321
(Continued)

OTHER PUBLICATIONS

The Unified Butterfly Effect: Efficient Security Credential Management System for Vehicular Communications Marcos A. Simplicio Jr., Eduardo Lopes Cominetti, Harsh Kupwade Patil, Jefferson E. Ricardini and Marcos Vinicius M. Silva pp. 1-8. 2018 IEEE Vehicular Networking Conference (VNC) (Year: 2018).*
(Continued)

*Primary Examiner* — Tauqir Hussain
(74) *Attorney, Agent, or Firm* — Barnes & Thornburg LLP

(57) ABSTRACT

Methods, computer programs, and registration authority modules for implementing a butterfly key expansion scheme. The method includes receiving a public caterpillar signing key of a private/public caterpillar signing key pair and a first pseudorandom function from a requesting device; expanding the public caterpillar signing key into public cocoon signing keys using the first pseudorandom function; generating certificate signing requests based on the public cocoon signing keys; sending the certificate signing requests to a certificate authority module; receiving signed pseudonym certificates from the certificate authority module; and encrypting the signed pseudonym certificates to generate response packages.

24 Claims, 7 Drawing Sheets

(58) Field of Classification Search
USPC .......................................................... 380/46
See application file for complete search history.

(56) References Cited

U.S. PATENT DOCUMENTS

| | | | |
|---|---|---|---|
| 2017/0093586 A1* | 3/2017 | Miranda | H04L 9/3268 |
| 2018/0343122 A1* | 11/2018 | Spacek | H04L 9/3247 |
| 2019/0089547 A1* | 3/2019 | Simplicio, Jr. | H04L 63/0823 |
| 2019/0123915 A1* | 4/2019 | Simplicio, Jr. | H04L 9/3268 |
| 2019/0215165 A1* | 7/2019 | Simplicio, Jr. | H04L 9/0861 |
| 2019/0245703 A1* | 8/2019 | Simplicio Junior, Jr. | H04L 9/3268 |
| 2020/0382320 A1* | 12/2020 | Ogawa | H04L 9/006 |
| 2021/0111904 A1* | 4/2021 | Ogawa | G09C 1/00 |
| 2021/0211306 A1* | 7/2021 | Barreto | H04L 9/3268 |
| 2023/0029523 A1* | 2/2023 | Cunha | H04L 9/3268 |

OTHER PUBLICATIONS

ACPC: Efficient revocation of pseudonym certificates using activation codes Marcos A. Simplicio Jr., Eduardo Lopes Cominetti, Harsh Kupwade Patil, Jefferson E. Ricardini and Marcos Vinicius M. Silva pp. 1-23. (Year: 2018).*

Schnorr-based implicit certification: improving the security and efficiency of V2X communications Paulo S. L. M. Barreto, Marcos A. Simplicio Jr., Jefferson E. Ricardini., and Harsh Kupwade Patil University of Washington Tacoma, USA, pp. 1-16 (Year: 2019).*

Barreto et al.; Schnorr-based implicit certifications: improving the security and efficiency of V2X communications; IACR ePrint; Mar. 22, 2019; pp. 1-16; downloaded from https://eprint.iacr.org/eprint-bin/getfile.pl?entry=2019/157&version=20190322:164525&file=157.pdf.

Brecht et al.; A Security Credential Management System for V2X Communications; IEEE Transactions on Intelligent Transportation Systems; 2018; vol. 19; pp. 3850-3871.

Simplicio Jr. et al.; ACPC: Efficient renovation of pseudonym certificates using activation codes; Ad Hoc Networks; Jul. 27, 2018; vol. 90; p. 101708.

Simplicio Jr. et al.; The Unified Butterfly Effect: Efficient Security Credential Management System for Vehicular Communications; 2018 IEEE Vehicular Networking Conference (VNC); IEEE; Dec. 5, 2018; pp. 1-8.

Search Report and Written Opinion for International Patent Application No. PCT/EP2020/063429; Jul. 9, 2020.

* cited by examiner

IMPLEMENTATION OF A BUTTERFLY KEY EXPANSION SCHEME

PRIORITY CLAIM

This patent application is a U.S. National Phase of International Patent Application No. PCT/EP2020/063429, filed 14 May 2020, which claims priority to U.S. Provisional Patent Application No. 62/847,829, filed 14 May 2019, the disclosures of which are incorporated herein by reference in their entireties.

SUMMARY

Illustrative embodiments relate to methods, computer programs, and registration authority modules for implementing a butterfly key expansion scheme. Illustrative embodiments further relate to a security credential management system using such methods, computer programs, or registration authority modules for implementing a butterfly key expansion scheme.

BRIEF DESCRIPTION OF THE DRAWINGS

Disclosed embodiments will become apparent from the following description and the appended claims in combination with the drawings, In which:

DETAILED DESCRIPTION

Figure 1:
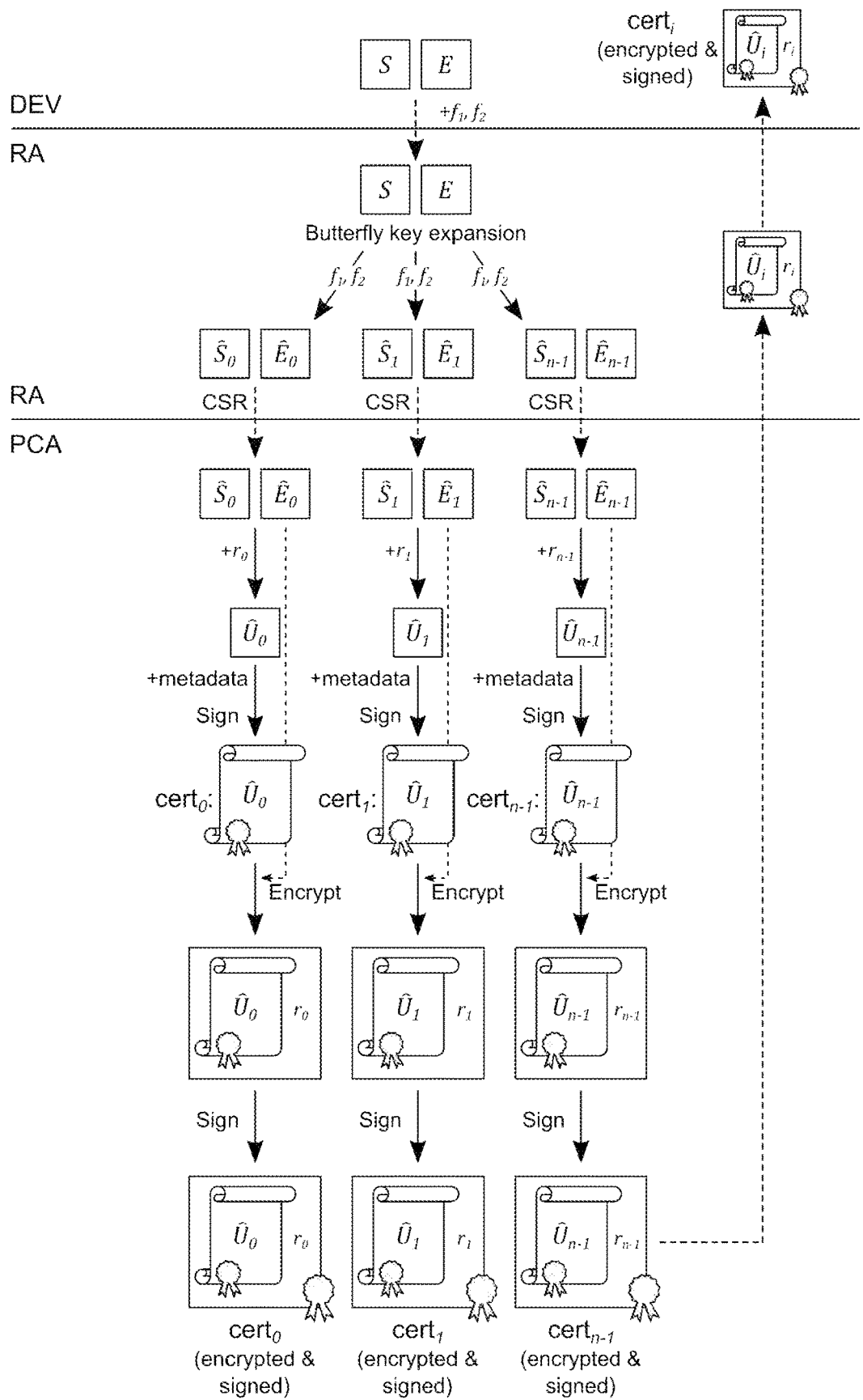
FIG. 1 shows a flowchart of a classical butterfly key expansion scheme.

With the increasing demand for intelligent transportation vehicles, security and privacy requirements are of paramount importance. For example, the authenticity of data exchanged via vehicle-to-vehicle or vehicle-to-infrastructure communications needs to be ensured to prevent any abuse of intelligent transportation systems. While traditional certificates might be used for this purpose, this approach conflicts with the requirements regarding the privacy of the users.

To cope with the requirements for authenticity and privacy, a variety of proposals for a vehicular public key infrastructure have been published. A particularly interesting approach makes use of pseudonym certificates, which do not contain any information that can be easily associated with the respective users. Therefore, pseudonym certificates are well suited for signing broadcast messages without compromising privacy.

One prominent solution for providing batches of pseudonym certificates is described in the article "A Security Credential Management System for V2X Communications" by B. Brecht et al. [1]. In the described system, a registration authority creates batches of pseudonym certificates for authorized transportation vehicles from a single request. For this purpose, a butterfly key expansion scheme is used, which requires two separate public/private key pairs that need to be provided by the requesting transportation vehicle. The registration authority shuffles the created certificates and sends them to a pseudonym certificate authority, which individually signs and encrypts the certificates before sending them back to the registration authority. The registration authority then delivers the signed and encrypted certificates to the requesting transportation vehicle.

A more efficient version of a security credential management system, designated as unified butterfly key expansion, is described in the article "The Unified Butterfly Effect: Efficient Security Credential Management System for Vehicular Communications" by M. A. Simplicio Jr. et al. [2]. The unified butterfly key expansion unifies the two separate public/private key pairs that need to be provided to the registration authority into a single key, which reduces the processing and bandwidth utilization for certificate provisioning.

Both solutions require a different handling of certificate signing requests at the certificate authority compared to traditional public key infrastructure, as additional calculations and processes need to be executed at the certificate authority. Therefore, the described solutions cannot be used in markets that only provide traditional certificate authorities for the generation of pseudonym certificates.

Approaches that do not require a different handling of certificate signing requests at the certificate authority, e.g., the EU C-ITS Credential Management System, provide a traditional certificate authority, but does not utilize butterfly key expansion.

Disclosed embodiments provide solutions for implementing a butterfly key expansion scheme without requiring a certificate authority to implement a different handling of certificate signing requests.

This is achieved by a method, a corresponding computer program, a registration authority module, and a security credential management system.

In a first disclosed embodiment, a method implemented in a registration authority module for implementing a butterfly key expansion scheme, the method comprising:
  receiving a public caterpillar signing key of a private/public caterpillar signing key pair and a first pseudorandom function from a requesting device;
  expanding the public caterpillar signing key into public cocoon signing keys using the first pseudorandom function;
  generating certificate signing requests based on the public cocoon signing keys;
  sending the certificate signing requests to a certificate authority module;
  receiving signed pseudonym certificates from the certificate authority module; and
  encrypting the signed pseudonym certificates to generate response packages.

In a second disclosed embodiment, a computer program comprises instructions, which, when executed by a computer, cause the computer to perform the following operations for implementing a butterfly key expansion scheme:

receiving a public caterpillar signing key of a private/public caterpillar signing key pair and a first pseudorandom function from a requesting device;

expanding the public caterpillar signing key into public cocoon signing keys using the first pseudorandom function;

generating certificate signing requests based on the public cocoon signing keys;

sending the certificate signing requests to a certificate authority module;

receiving signed pseudonym certificates from the certificate authority module; and encrypting the signed pseudonym certificates to generate response packages.

The term computer is to be understood broadly. It may likewise include workstations, distributed processing solutions or other processing units.

The computer program may, for example, be provided for download or stored on a computer-readable storage medium.

In a third disclosed embodiment, a registration authority module configured to implement a butterfly key expansion scheme comprises:

a first reception module configured to receive a public caterpillar signing key of a private/public caterpillar signing key pair and a first pseudorandom function from a requesting device;

an expansion module configured to expand the public caterpillar signing key into public cocoon signing keys using the first pseudorandom function;

a generator module configured to generate certificate signing requests based on the public cocoon signing keys;

a transmission module configured to send the certificate signing requests to a certificate authority module;

a second reception module configured to receive signed pseudonym certificates from the certificate authority module; and an encryption module configured to encrypt the signed pseudonym certificates to generate response packages.

The present solution allows implementing a butterfly key expansion scheme in a security credential management system without the need for an adapted certificate authority. Instead, a traditional certificate authority can be used. In contrast to the classical butterfly key expansion scheme and the unified butterfly key expansion scheme, a necessary requirement is that one needs to trust the registration authority, as the registration authority is able to learn which pseudonym certificates belong to which device.

In at least one disclosed embodiment, the certificate signing requests are generated by inserting each public cocoon signing key into a corresponding certificate signing request. In this solution, the registration authority may skip creating public butterfly signing keys, which reduces the processing load of the registration authority. However, the requesting device needs to adapt its key derivation function accordingly for calculating the respective private keys for the resulting pseudonym certificates.

In at least one disclosed embodiment, the certificate signing requests are generated by creating a public butterfly signing key from each public cocoon signing key and inserting each public butterfly signing key into a corresponding certificate signing request. Optionally, the public butterfly signing keys are created from the public cocoon signing keys using random numbers. In this way, the requesting devices do not need to adapt their key derivation functions for calculating the respective private keys for the resulting pseudonym certificates.

In at least one disclosed embodiment, the random numbers are included in the response packages. This ensures that the requesting device is able to compute the private butterfly signing keys based on the pseudonym certificates.

In at least one disclosed embodiment, the signed pseudonym certificates are encrypted using the public cocoon signing keys. In this way, it is ensured that only the requesting device can decrypt the responses of the certificate authority to learn the public butterfly signing keys and compute the corresponding private butterfly signing keys.

In at least one disclosed embodiment, the signed pseudonym certificates are encrypted using public cocoon encryption keys. Optionally, the public cocoon encryption keys are derived by expanding a public caterpillar encryption key of a private/public caterpillar encryption key pair using a second pseudorandom function. For example, the public caterpillar encryption key and the second pseudorandom function may be received by the registration authority module from the requesting device. In this way, it is ensured that only the requesting device can decrypt the responses of the certificate authority to learn the public butterfly signing keys and compute the corresponding private butterfly signing keys.

In at least one disclosed embodiment, the response packages are signed. Signing the response packages prevents the registration authority, for example, from manipulating the public cocoon encryption keys.

In at least one disclosed embodiment, the response packages are provided for download by the requesting device. For this purpose, the registration authority stores the encrypted responses from the certificate authority until the requesting device is online again to download them. In this way, the requesting device does not need to be online continuously.

A security credential management system comprises a registration authority module as described above or is configured to perform a method as described above for implementing a butterfly key expansion scheme.

For a better understanding of the principles of the present disclosure, exemplary embodiments are explained in more detail below with reference to the figures. The figures and descriptions provided herein may have been simplified to illustrate properties that are relevant for a clear understanding of the herein described devices, systems, and methods, while eliminating, for the purpose of clarity, other properties that may be found in typical devices, systems, and methods. Those of ordinary skill in the art may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described properties that would be known to those of ordinary skill in the art.

In the following, the classical butterfly key expansion scheme and the unified butterfly key expansion scheme shall be described in more detail.

FIG. 1 shows a flowchart of a classical butterfly key expansion scheme. In the classical butterfly key expansion scheme the requesting device DEV creates one signature key pair $(s, S=s \cdot G)$ and an additional encryption key pair $(e, E=e \cdot G)$, where G is a generator of an elliptic curve group. Those initial key pairs are called caterpillar key pairs. Furthermore, the requesting device DEV creates two pseudorandom functions $f_1$ and $f_2$. The requesting device DEV then sends the pseudorandom functions $f_1$ and $f_2$ and the public parts S and E of the caterpillar key pairs to a registration authority RA. The registration authority RA expands the public caterpillar keys S and E into n public cocoon signing keys $\hat{S}_i=S+f_1(i)\cdot G$ and cocoon encryption keys $\hat{E}_i=E+f_2(i)\cdot G$ using the provided functions $f_1$ and $f_2$, with $0\le i<n$ for an arbitrary value of n. The registration authority RA creates one certificate signing request CSR per public cocoon signing key $\hat{S}_i$ and sends them together with the corresponding public cocoon encryption key $\hat{E}_i$ to a pseudonym certificate authority PCA. The registration authority RA does so constantly from the moment the requesting device DEV sends the information to generate as many certificates as required. In this operation, certificate signing requests CSR from different requesting devices DEV are shuffled together by the registration authority RA. The pseudonym certificate authority PCA then has to create for each certificate signing request CSR the public butterfly key first by adding a true random number $r_i$: $\hat{U}_i=\hat{S}_i+r_i\cdot G$. The pseudonym certificate authority PCA inserts the resulting public butterfly key $\hat{U}_i$ in the certificate signing request CSR and signs it to create the pseudonym certificate $cert_i$. The pseudonym certificate authority PCA then encrypts the certificate $cert_i$ together with the random number $r_i$ using the public cocoon encryption key $\hat{E}_i$. Finally, the pseudonym certificate authority PCA signs the encrypted response, before it sends it back to the registration authority RA. The registration authority RA stores the encrypted responses from the pseudonym certificate authority PCA until the requesting device DEV is online again to download them.

Figure 2:
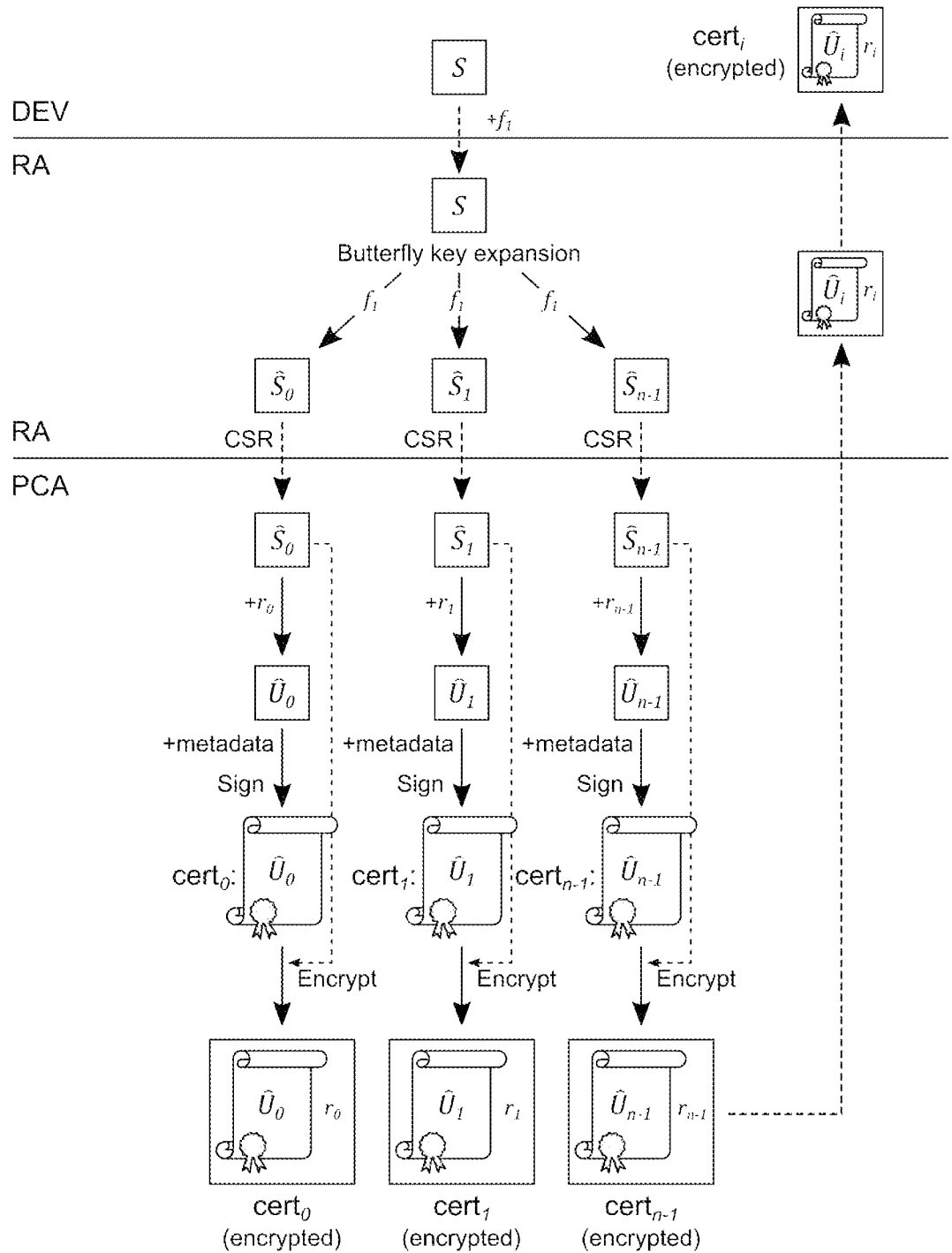
FIG. 2 shows a flowchart of a unified butterfly key expansion scheme.

FIG. 2 shows a flowchart of a unified butterfly key expansion scheme. In the unified butterfly key expansion scheme the requesting device DEV creates one signature key pair (s,S=s·G), where G is a generator of an elliptic curve group. This initial key pair is called caterpillar key pair. Furthermore, the requesting device DEV creates a pseudorandom function $f_1$. The requesting device DEV then sends the pseudorandom function $f_1$ and the public part S of the caterpillar key pair to a registration authority RA. The registration authority RA expands the public caterpillar key S into n public cocoon signing keys $\hat{S}_i=S+f_1(i)\cdot G$ using the provided function $f_1$, with $0\le i<n$ for an arbitrary value of n. The registration authority RA creates one certificate signing requests CSR per public cocoon signing key $\hat{S}_i$ and sends them to a pseudonym certificate authority PCA. The registration authority RA does so constantly from the moment the requesting device DEV sends the information to generate as many certificates as required. In this operation, certificate signing requests CSR from different requesting devices DEV are shuffled together by the registration authority RA. The pseudonym certificate authority PCA then has to create for each certificate signing request CSR the public butterfly key first by adding a true random number $r_i$: $\hat{U}_i=\hat{S}_i+r_i\cdot G$. The pseudonym certificate authority PCA inserts the resulting public butterfly key $\hat{U}_i$ in the certificate signing request CSR and signs it to create the pseudonym certificate $cert_i$ The pseudonym certificate authority PCA then encrypts the certificate $cert_i$ together with the random number $r_i$ using the public cocoon signing key $\hat{S}_i$. Finally, the pseudonym certificate authority PCA sends the encrypted response back to the registration authority RA.

In both the classical butterfly key expansion scheme and the unified butterfly key expansion scheme, the behavior of the pseudonym certificate authority PCA is different from that of a traditional certificate authority, where the certificate authority takes the certificate signing request CSR as is and signs it, before sending it back unencrypted.

To preserve the benefits of the classical butterfly key expansion scheme and the unified butterfly key expansion scheme, such as bandwidth conservation or constant pre-generation of certificates, in case only a traditional certificate authority is available, according to the present principles the operations that are executed by the registration authority are modified. The handling at the side of the requesting device is preserved.

Figure 3:
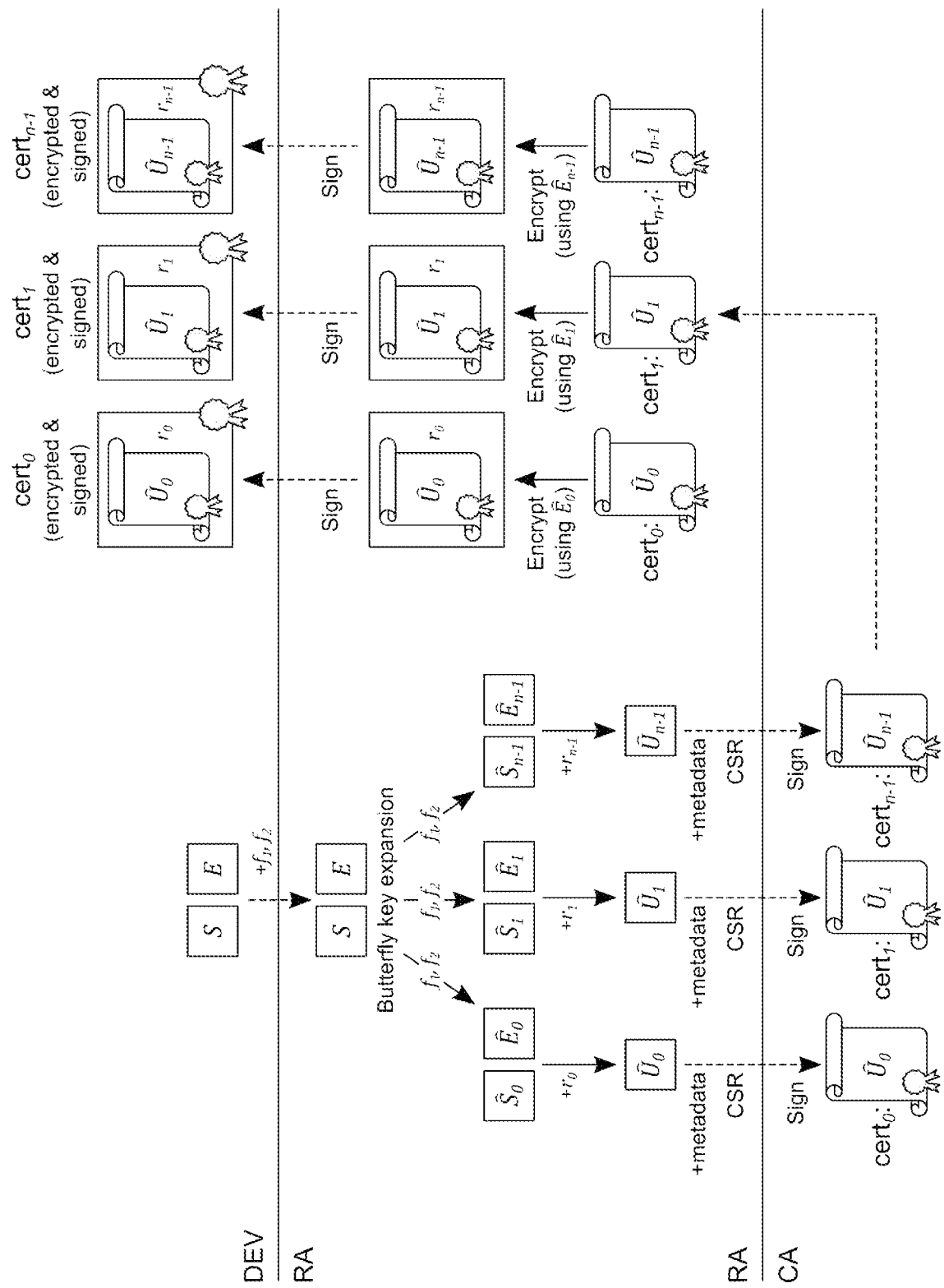
FIG. 3 shows a flowchart of a first butterfly key expansion scheme working with a traditional certificate authority.

FIG. 3 shows a flowchart of a first butterfly key expansion scheme working with a traditional certificate authority, which is based on the classical butterfly key expansion scheme. The requesting device DEV creates two caterpillar key pairs, i.e., one signature key pair (s,S=s·G) and an additional encryption key pair (e,E=e·G), where G is a generator of an elliptic curve group. Furthermore, the requesting device DEV creates two pseudorandom functions $f_1$ and $f_2$. The requesting device DEV then sends the pseudorandom functions $f_1$ and $f_2$ and the public parts S and E of the caterpillar key pairs to the registration authority RA. The registration authority RA expands the public caterpillar keys S and E into n public cocoon signing keys $\hat{S}_i=S+f_1(i)\cdot G$ and cocoon encryption keys $\hat{E}_i=E+f_2(i)\cdot G$ using the provided functions $f_1$ and $f_2$, with $0\le i<n$ for an arbitrary value of n. Contrary to the classical butterfly key expansion scheme, the registration authority RA now takes the public cocoon signing keys $\hat{S}_i$ and creates the public butterfly keys by adding a true random number $r_i$: $\hat{U}_i=\hat{S}_i+r_i\cdot G$. The creation of the public butterfly keys $\hat{U}_i$ is thus no longer performed by the certificate authority CA. The registration authority RA inserts the public butterfly keys $\hat{U}_i$ in the individual certificate signing requests CSR and sends the certificate signing requests CSR to a traditional certificate authority CA. The certificate authority CA signs the certificate signing requests CSR and sends the resulting pseudonym certificates $cert_i$ back immediately. The registration authority RA now takes the public cocoon encryption keys $\hat{E}_i$ and encrypts the pseudonym certificates $cert_i$ together with the random numbers $r_i$ used to generate the public butterfly keys $\hat{U}_i$. The registration authority RA then signs the encrypted package and provides the result for download by the requesting device DEV.

Figure 4:
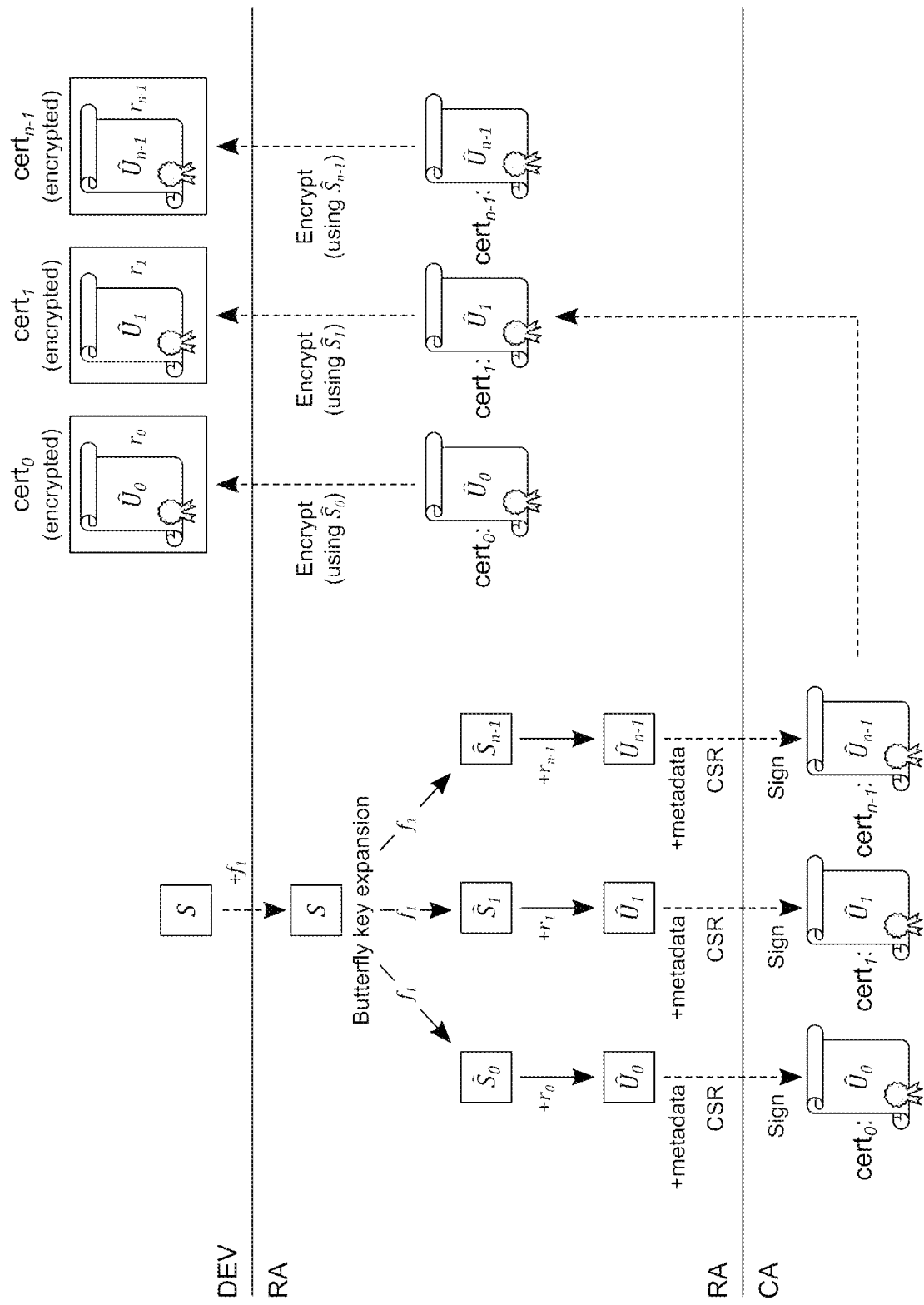
FIG. 4 shows a flowchart of a second butterfly key expansion scheme working with a traditional certificate authority.

FIG. 4 shows a flowchart of a second butterfly key expansion scheme working with a traditional certificate authority, which is based on the unified butterfly key expansion scheme. The requesting device DEV creates one caterpillar key pair, i.e., a signature key pair (s,S=s·G), where G is a generator of an elliptic curve group. Furthermore, the requesting device DEV creates a pseudorandom function $f_1$. The requesting device DEV then sends the pseudorandom function $f_1$ and the public part S of the caterpillar key pair to the registration authority RA. The registration authority RA expands the public caterpillar key S into n public cocoon signing keys $\hat{S}_i=S+f_1(i)\cdot G$ using the provided function $f_1$, with $0\le i<n$ for an arbitrary value of n. Contrary to the unified butterfly key expansion scheme, the registration authority RA now takes the public cocoon signing keys $\hat{S}_i$ and creates the public butterfly keys by adding a true random number $r_i$: $\hat{U}_i=\hat{S}_i+r_i\cdot G$. The creation of the public butterfly keys $\hat{U}_i$ is thus no longer performed by the certificate authority CA. The registration authority RA inserts the public butterfly keys $\hat{U}_i$ in the individual certificate signing requests CSR and sends the certificate signing requests CSR to a traditional certificate authority CA. The certificate authority CA signs the certificate signing requests CSR and sends the resulting pseudonym certificates $cert_i$ back immediately. The registration authority RA now takes public cocoon signing keys $\hat{S}_i$ and encrypts the pseudonym certificates $cert_i$ together with the random numbers $r_i$ used to generate the public butterfly keys $\hat{U}_i$. The registration authority RA then provides the encrypted package for download by the requesting device DEV.

In a slightly modified approach, which may be applied to the butterfly key expansion schemes shown in FIG. 3 and FIG. 4, the registration authority RA may skip the operation of creating the public butterfly keys $\hat{U}_i$ and instead use the public cocoon signing keys $\hat{S}_i$ in the certificate signing requests CSR. Everything else stays the same, except that the response package now does not include $r_i$. The requesting device DEV has to change its key derivation function accordingly for calculating the respective private key for the pseudonym certificate $cert_i$.

Figure 5:
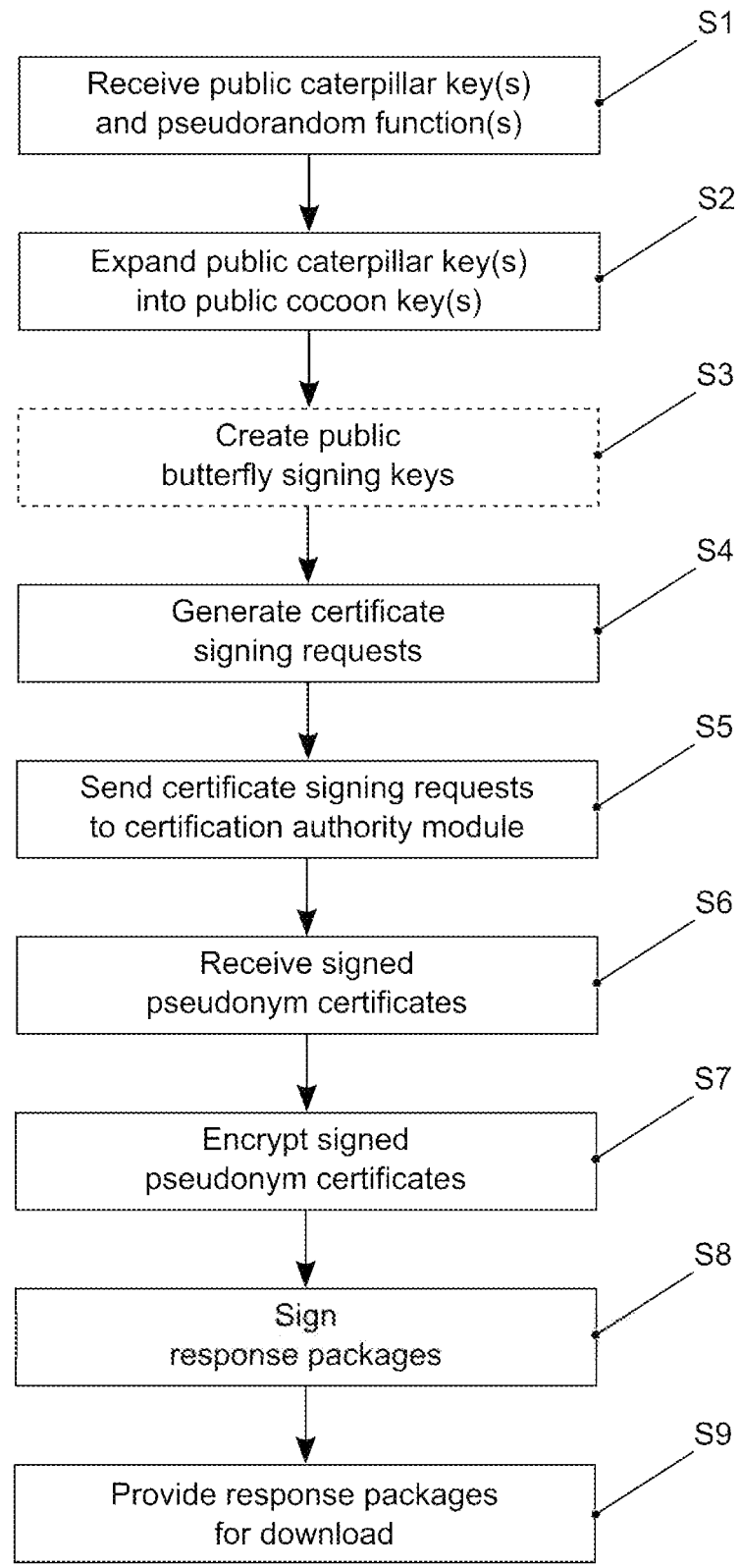
FIG. 5 shows a flowchart of an exemplary method for implementing a butterfly key expansion scheme.

In FIG. 5, a flowchart of a method according to the present principles for implementing a butterfly key expansion scheme is shown. In a first operation, a public caterpillar signing key of a private/public caterpillar signing key pair and a first pseudorandom function are received S1 from a requesting device. In addition, a public caterpillar encryption key of a private/public caterpillar encryption key pair and a second pseudorandom function may be received S1 from the requesting device. The public caterpillar signing key is expanded S2 into public cocoon signing keys using the first pseudorandom function. Similarly, the caterpillar encryption key may be expanded S2 into public cocoon encryption keys using the second pseudorandom function. Certificate signing requests are then generated S4 based on the public cocoon signing keys, e.g., by optionally creating S3 a public butterfly signing key from each public cocoon signing key and inserting each public butterfly signing key into a corresponding certificate signing request. For example, the public butterfly signing keys may be created S3 from the public cocoon signing keys using random numbers. Alternatively, the certificate signing requests may be generated S4 by inserting each public cocoon signing key into a corresponding certificate signing request. The certificate signing requests are subsequently sent S5 to a certificate authority module. In response, signed pseudonym certificates are received S6 from the certificate authority module. The signed pseudonym certificates are then encrypted S7 to generate response packages. For this purpose, the public cocoon signing keys or the public cocoon encryption keys may be used. In case public butterfly signing keys are created S3 from the public cocoon signing keys using random numbers, these random numbers may be included in the response packages. The resulting response packages may further be signed S8 and provided S9 for download by the requesting device.

Figure 6:
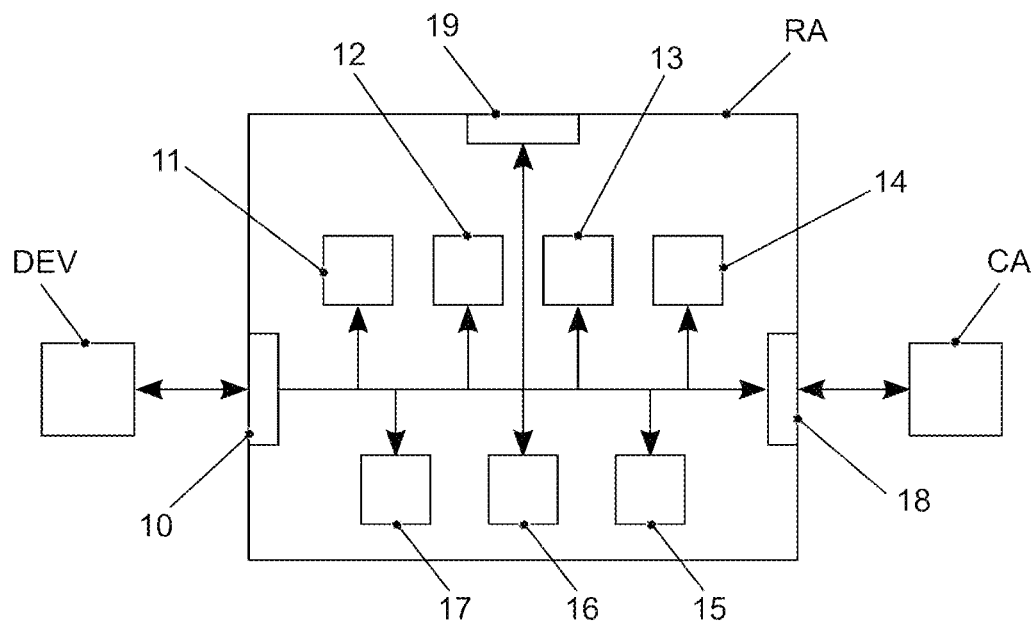
FIG. 6 schematically illustrates a first exemplary embodiment of a registration authority module, which is configured to implement a butterfly key expansion.

A block diagram of a first exemplary embodiment of a registration authority module RA according to the present principles, which is configured to implement a butterfly key expansion, is illustrated in FIG. 6. The registration authority module RA has a first transmission module 11 configured to receive a public caterpillar signing key of a private/public caterpillar signing key pair and a first pseudorandom function via a first interface 10 from a requesting device DEV. In addition, the first transmission module 11 may be configured to receive a public caterpillar encryption key of a private/public caterpillar encryption key pair and a second pseudorandom function from the requesting device DEV. An expansion module 12 is configured to expand the public caterpillar signing key into public cocoon signing keys using the first pseudorandom function. Similarly, the expansion module 12 may be configured to expand the caterpillar encryption key into public cocoon encryption keys using the second pseudorandom function. A generator module 13 is configured to generate certificate signing requests based on the public cocoon signing keys, e.g., by creating a public butterfly signing key from each public cocoon signing key and inserting each public butterfly signing key into a corresponding certificate signing request. For example, the public butterfly signing keys may be created from the public cocoon signing keys using random numbers. Alternatively, the generator module 13 may be configured to generate the certificate signing requests by inserting each public cocoon signing key into a corresponding certificate signing request. A second transmission module 14 is configured to send the certificate signing requests to a certificate authority module CA via a second interface and to receive signed pseudonym certificates from the certificate authority module CA. An encryption module 15 is configured to encrypt the signed pseudonym certificates to generate response packages. For this purpose, the public cocoon signing keys or the public cocoon encryption keys may be used. In case public butterfly signing keys are created from the public cocoon signing keys using random numbers, these random numbers may be included in the response packages. The resulting response packages may further be signed and provided for download by the requesting device DEV via the first interface 10.

The various modules 11-15 of the registration authority module RA may be controlled by a control module 16. A user interface 19 may be provided for enabling a user to modify settings of the different modules 11-16. The data available in the registration authority module RA may be stored in a local storage unit 17, e.g., for a later evaluation or for use by the various components of the registration authority module RA. The different modules 11-16 can be embodied as dedicated hardware units. Of course, they may likewise be fully or partially combined into a single unit or implemented as software running on a processor, e.g., a GPU or a CPU. The second interface 19 may also be combined with the first interface 10 into a single bidirectional interface.

Figure 7:
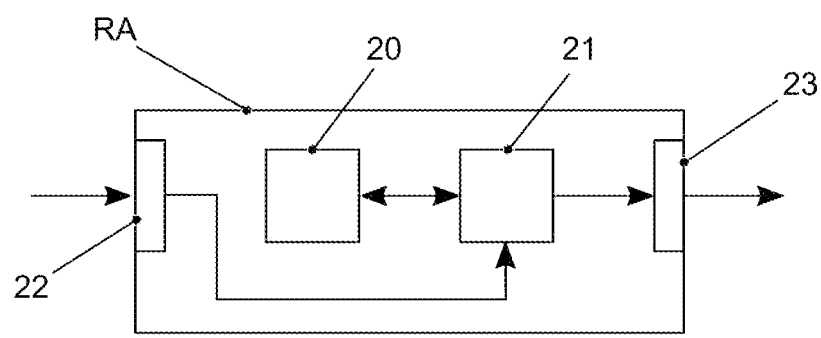
FIG. 7 schematically illustrates a second exemplary embodiment of a registration authority module, which is configured to implement a butterfly key expansion.

A block diagram of a second exemplary embodiment of a registration authority module RA according to the present principles, which is configured to implement a butterfly key expansion, is illustrated in FIG. 7. The registration authority module RA comprises a processing device 20 and a memory device 21 storing instructions that, when executed, cause the registration authority module RA to perform operations according to one of the described methods.

For example, the processing device 20 can be a processor adapted to perform the operations according to one of the described methods. In an exemplary embodiment, the adaptation comprises that the processor is configured, e.g., programmed, to perform operations according to one of the described methods. A processor as used herein may include one or more processing units, such as microprocessors, digital signal processors, or a combination thereof.

The registration authority module RA has an input 22 for receiving data, in particular from a requesting device. Data generated by the processing device 20 are made available at an output 23. They may likewise be stored in the memory device 21. The input 22 and the output 23 may be combined into a bidirectional interface.

The local storage unit 17 and the memory device 21 may include volatile and/or non-volatile memory regions and storage devices such as hard disk drives and DVD drives. A part of the memory is a non-transitory program storage device readable by the processing device 20, tangibly embodying a program of instructions executable by the processing device 20 to perform program operations as described herein according to the present principles.

In an exemplary embodiment, a computer program comprises program code, which, when executed by a computing system, causes the computing system to perform the method according to the present principles.

Figure 8:
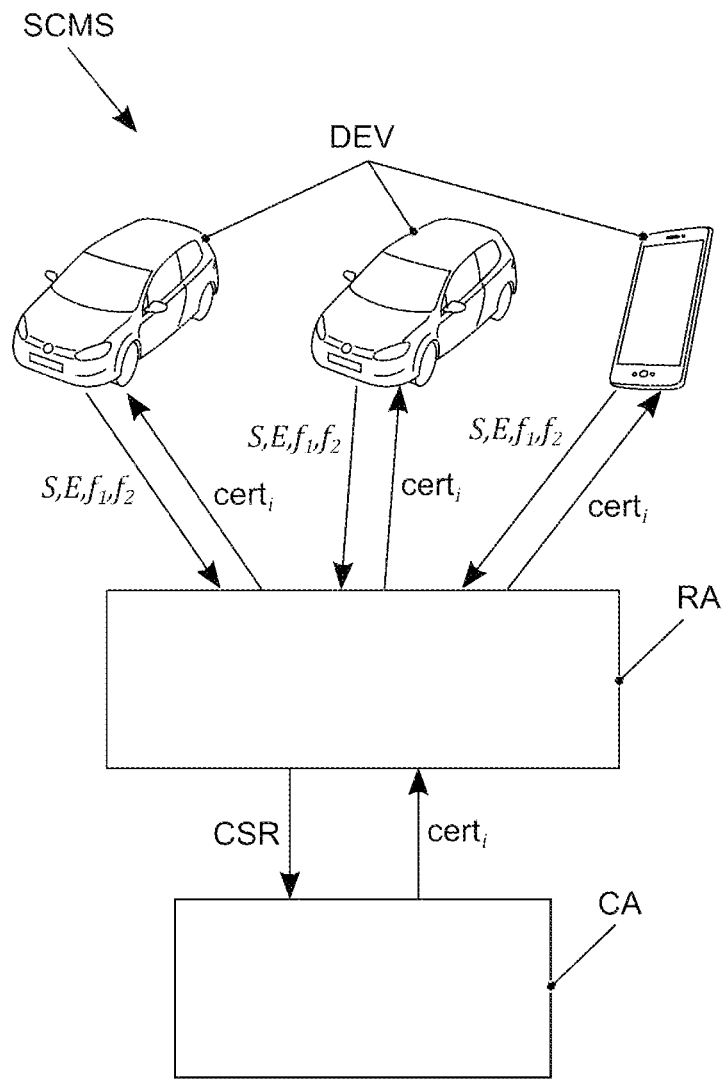
FIG. 8 schematically illustrates a system diagram of a security credential management system.

FIG. 8 schematically illustrates a system diagram of a security credential management system SCMS. Only the elements of the security credential management system SCMS that are pertinent for the present principles are shown. Basically, the security credential management system SCMS comprises requesting devices DEV, e.g., transportation vehicles or mobile communications devices, at least one registration authority module RA, and at least one certificate authority module CA. The requesting devices DEV send public caterpillar key(s) S, E and pseudorandom function(s) $f_1$, $f_2$ to the registration authority module RA. Based on these input data the registration authority module RA generates certificate signing request CSR and sends these certificate signing requests CSR to the certificate authority module CA. The certificate authority CA signs the certificate signing requests CSR and sends the resulting pseudonym certificates $cert_i$ back to the registration authority module RA. The registration authority module RA encrypts the pseudonym certificates $cert_i$ and provides the encrypted package for download by the requesting devices DEV. If necessary, the registration authority module RA may further sign the response packages.

It should be understood that the presently disclosed embodiments may be implemented using dedicated or shared hardware included in a transportation vehicle. Therefore, components of the module may be used by other components of a transportation vehicle to provide vehicle functionality without departing from the scope of the present disclosure.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. In some illustrative embodiments, well-known processes, well-known device structures, and well-known technologies are not described in detail.

Terminology has been used herein for the purpose of describing particular illustrative embodiments only and is not intended to be limiting. The singular form of elements referred to above may be intended to include the plural forms, unless the context indicates otherwise. The method operations, processes, and operations described herein are not to be construed as necessarily requiring their performance in the particular order discussed or illustrated, unless specifically identified as an order of performance or a particular order is inherently necessary for embodiment to be operational. It is also to be understood that additional or alternative operations may be employed.

Disclosed embodiments include the methods described herein and their equivalents, non-transitory computer readable media programmed to carry out the methods and a computing system configured to carry out the methods. Further, included is a transportation vehicle comprising components that include any of the methods, non-transitory computer readable media programmed to implement the instructions or carry out the methods, and systems to carry out the methods. The computing system, and any sub-computing systems, will typically include a machine readable storage medium containing executable code; one or more processors; memory coupled to the one or more processors; an input device, and an output device connected to the one or more processors to execute the code. A machine-readable medium may include any mechanism for storing or transmitting information in a form readable by a machine, such as a computer processor. The information may be stored, for example, in volatile or non-volatile memory. Additionally, embodiment functionality may be implemented using embedded devices and online connection to cloud computing infrastructure available through radio connection (e.g., wireless communication) with such infrastructure.

It can be appreciated that illustrative embodiments and the functional operations described in this specification can be implemented in digital electronic circuitry, in tangibly-embodied computer software or firmware, in computer hardware, including the structures disclosed in this specification and their structural equivalents, or in combinations of one or more of them. Disclosed embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

While this specification contains many specific implementation details, these should not be construed as limitations on the scope of any embodiments or on the scope of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be beneficial. Moreover, the separation of various system modules and components in the embodiments described above should not be understood as requiring such separation in all embodiments, and it should be understood that the described program components and systems can generally be integrated together in a single software product or packaged into multiple software products.

REFERENCES

[1] B. Brecht et al.: "A Security Credential Management System for V2X Communications", IEEE TRANSAC- TIONS ON INTELLIGENT TRANSPORTATION SYSTEMS, VOL. 19 (2018), pp. 3850-3871. (https://ieeexplore.ieee.org/stamp/stamp.jsp?tp=&arnumber=8309336)

[2] M. A. Simplicio Jr. et al.: "The Unified Butterfly Effect: Efficient Security Credential Management System for Vehicular Communications", 2018 IEEE Vehicular Networking Conference (VNC, pp. 1-8. https://eprint.iacr.org/2018/089

LIST OF REFERENCE NUMERALS

10 First interface
11 First transmission module
12 Expansion module
13 Generator module
14 Second transmission module
15 Encryption module
16 Control module
17 Local storage unit
18 Second interface
19 User interface
20 Processing device
21 Memory device
22 Input
23 Output
CA Certificate authority module
$cert_i$ Certificate
CSR Certificate signing request
DEV Requesting device
PCA Pseudonym certificate authority module
RA Registration authority module
SCMS Security credential management system
S1 Receive public caterpillar key(s) and pseudorandom function(s)
S2 Expand public caterpillar key(s) into public cocoon key(s)
S3 Create public butterfly signing keys
S4 Generate certificate signing requests
S5 Send certificate signing requests to certificate authority module
S6 Receive signed pseudonym certificates
S7 Encrypt signed pseudonym certificates
S8 Sign response packages
S9 Provide response packages for download

The invention claimed is:

1. A method for implementing a butterfly key expansion scheme, the method comprising:
a registration authority module, comprised of software running on a processor, the registration authority module receiving a public caterpillar signing key of a private/public caterpillar signing key pair and a first pseudorandom function from a requesting device;
the registration authority module expanding the public caterpillar signing key into public cocoon signing keys using the first pseudorandom function;
the registration authority module generating certificate signing requests based on the public cocoon signing keys;
the registration authority module sending the certificate signing requests to a certificate authority module;
the registration authority module receiving unencrypted signed pseudonym certificates from the certificate authority module; and
the registration authority module encrypting the unencrypted signed pseudonym certificates to generate response packages for downloading by the requesting device.

2. The method of claim 1, wherein the certificate signing requests are generated by the registration authority by inserting each public cocoon signing key into a corresponding certificate signing request.

3. The method of claim 1, wherein the certificate signing requests are generated by the registration authority by creating a public butterfly signing key from each public cocoon signing key and inserting each public butterfly signing key into a corresponding certificate signing request.

4. The method of claim 3, wherein the public butterfly signing keys are created by the registration authority from the public cocoon signing keys using random numbers.

5. The method of claim 4, further comprising the registration authority including the random numbers in the response packages.

6. The method of claim 1, wherein the unencrypted signed pseudonym certificates are encrypted using the public cocoon signing keys.

7. The method of claim 1, wherein the unencrypted signed pseudonym certificates are encrypted using public cocoon encryption keys.

8. The method of claim 7, wherein the public cocoon encryption keys are derived by expanding a public caterpillar encryption key of a private/public caterpillar encryption key pair using a second pseudorandom function.

9. The method of claim 8, wherein the public caterpillar encryption key and the second pseudorandom function are received by the registration authority module from the requesting device.

10. The method of claim 7, further comprising the registration authority signing the response packages.

11. The method of claim 1, further comprising the registration authority providing the response packages for download by the requesting device.

12. A non-transitory computer readable medium including a computer program comprising instructions, which, when executed by the computer, cause the computer to perform the method of claim 1 for implementing a butterfly key expansion scheme.

13. A registration authority module configured to implement a butterfly key expansion scheme, the registration authority module comprising:
a first transmission module to receive a public caterpillar signing key of a private/public caterpillar signing key pair and a first pseudorandom function from a requesting device;
an expansion module to expand the public caterpillar signing key into public cocoon signing keys using the first pseudorandom function;
a generator module to generate certificate signing requests based on the public cocoon signing keys;
a second transmission module to send the certificate signing requests to a certificate authority module and to receive unencrypted signed pseudonym certificates from the certificate authority module; and
an encryption module to encrypt the unencrypted signed pseudonym certificates to generate response packages for downloading by the requesting device,
wherein the registration authority module and its constituent modules are comprised of software running on a processor.

14. A security credential management system comprising:

the registration authority module of claim 13 that performs a method for implementing a butterfly key expansion scheme.

15. The registration authority module of claim 13, wherein the certificate signing requests are generated by inserting each public cocoon signing key into a corresponding certificate signing request.

16. The registration authority module of claim 13, wherein the certificate signing requests are generated by creating a public butterfly signing key from each public cocoon signing key and inserting each public butterfly signing key into a corresponding certificate signing request.

17. The registration authority module of claim 16, wherein the public butterfly signing keys are created from the public cocoon signing keys using random numbers.

18. The registration authority module of claim 17, wherein the random numbers are included in the response packages.

19. The registration authority module of claim 13, wherein the unencrypted signed pseudonym certificates are encrypted using the public cocoon signing keys.

20. The registration authority module of claim 13, wherein the unencrypted signed pseudonym certificates are encrypted using public cocoon encryption keys.

21. The registration authority module of claim 20, wherein the public cocoon encryption keys are derived by expanding a public caterpillar encryption key of a private/public caterpillar encryption key pair using a second pseudorandom function.

22. The registration authority module of claim 21, wherein the public caterpillar encryption key and the second pseudorandom function are received by the registration authority module from the requesting device.

23. The registration authority module of claim 20, wherein the response packages are signed.

24. The registration authority module of claim 1, wherein the response packages are provided for download by the requesting device.

* * * * *